US012649997B2

(12) United States Patent
Qiu et al.

(10) Patent No.: US 12,649,997 B2
(45) Date of Patent: Jun. 9, 2026

(54) SOFT GROUND CLEANING VEHICLE

(71) Applicant: HANGZHOU CITY UNIVERSITY, Hangzhou (CN)

(72) Inventors: Qi Qiu, Hangzhou (CN); Hao Chen, Hangzhou (CN); Mingbin Gong, Hangzhou (CN); Yangfang Wu, Hangzhou (CN); Pengfei Wang, Hangzhou (CN); Wen Yu, Hangzhou (CN); Jun Zhang, Hangzhou (CN)

(73) Assignee: HANGZHOU CITY UNIVERSITY, Hangzhou (CN)

( * ) Notice: Subject to any disclaimer, the term of this patent is extended or adjusted under 35 U.S.C. 154(b) by 455 days.

(21) Appl. No.: 18/518,370

(22) Filed: Nov. 22, 2023

(65) Prior Publication Data

US 2024/0084533 A1     Mar. 14, 2024

Related U.S. Application Data

(63) Continuation of application No. PCT/CN2023/084993, filed on Mar. 30, 2023.

(30) Foreign Application Priority Data

May 12, 2022     (CN) .......................... 202210517958.2

(51) Int. Cl.
*E01H 12/00*          (2006.01)
*B07B 1/00*          (2006.01)
          (Continued)

(52) U.S. Cl.
CPC ........... *E01H 12/002* (2013.01); *B07B 1/005* (2013.01); *B07B 1/36* (2013.01); *B62D 57/036* (2013.01)

(58) Field of Classification Search
CPC ....... E01H 12/00; E01H 12/002; B07B 1/005; B07B 1/36; B62D 57/036
See application file for complete search history.

(56) References Cited

U.S. PATENT DOCUMENTS 2,076,348 A * 4/1937 Petersen ................... B07B 1/42
                                                          209/344
3,395,671 A   8/1968 Zimmerman, Jr.
                (Continued)

FOREIGN PATENT DOCUMENTS

CN          104525473 A     4/2015
CN          108330874 A     7/2018
                (Continued)

OTHER PUBLICATIONS

International Search Report issued in corresponding International application No. PCT/CN2023/084993, mailed Sep. 16, 2023 (12 pages).

(Continued)

*Primary Examiner* — Joseph M Rocca
*Assistant Examiner* — Julia C Tran

(57)          ABSTRACT

A soft ground cleaning vehicle, including a main body frame; wherein each of both sides of the main body frame is arranged with a screw propulsion mechanism, and a lower portion of each of the both sides of the main body frame is arranged with a bottom frame; a power assembly is arranged on the bottom frame, and an extension frame is arranged on a lower portion of the bottom frame; the extension frame is arranged with a rotation assembly; a plastic track is arranged on the power assembly and the rotation assembly; a plurality of stand plates are arranged on an outer strip surface of the plastic track.

10 Claims, 6 Drawing Sheets

(51) Int. Cl.
B07B 1/36 (2006.01)
B62D 57/036 (2006.01)

(56) References Cited

U.S. PATENT DOCUMENTS

| | | | | | |
|---|---|---|---|---|---|
| 3,556,224 | A | * | 1/1971 | Bogie | E01H 12/00 |
| | | | | | 171/116 |
| 3,621,919 | A | * | 11/1971 | Olson | E01H 12/00 |
| | | | | | 171/120 |
| 3,640,386 | A | * | 2/1972 | Frangos | B22F 12/222 |
| | | | | | 209/337 |
| 4,014,390 | A | * | 3/1977 | Teixeira | A01D 17/10 |
| | | | | | 171/124 |
| 5,133,413 | A | | 7/1992 | Baxter | |
| 5,509,370 | A | * | 4/1996 | Kovacs | B60F 3/0023 |
| | | | | | 180/7.2 |
| 10,076,938 | B2 | * | 9/2018 | Olmedo | G01N 33/24 |

| | | | | | |
|---|---|---|---|---|---|
| 2002/0170765 | A1 | * | 11/2002 | Bauer | E01H 12/00 |
| | | | | | 180/308 |
| 2012/0318720 | A1 | * | 12/2012 | Whitley | E01H 12/002 |
| | | | | | 209/235 |
| 2017/0254036 | A1 | * | 9/2017 | Zwickl | B07B 1/4609 |

FOREIGN PATENT DOCUMENTS

| | | | |
|---|---|---|---|
| CN | 110565606 | A | 12/2019 |
| CN | 111515115 | A | 8/2020 |
| CN | 211898272 | U | 11/2020 |
| CN | 114922128 | A | 8/2022 |
| FR | 2624147 | A1 | 6/1989 |

OTHER PUBLICATIONS

Written Opinion of the International Search Authority in corresponding International application No. PCT/CN2023/084993, mailed Sep. 16, 2023 (10 pages).

* cited by examiner

SOFT GROUND CLEANING VEHICLE

CROSS REFERENCE TO RELATED APPLICATION

The present disclosure is a continuation-application of International (PCT) Patent Application No. PCT/CN2023/084993, filed on Mar. 30, 2023, which claims priority of Chinese Patent Applications No. 202210517958.2, filed on May 12, 2022, the entire contents of which are hereby incorporated by reference in their entirety.

TECHNICAL FIELD

The present disclosure relates to the technical field of cleaning vehicles, and in particular to a soft ground cleaning vehicle.

BACKGROUND

Beach garbage such as sea garbage brought about by high tide, land garbage brought about by floods, and household garbage dropped by tourists not only affect the appearance of the beach, but also produce a foul odor from organic garbage decay, which seriously pollutes the marine ecological environment through the washing of seawater. In this regard, a beach cleaner has been developed, such as a Chinese Patent No. CN210238412U, which discloses a beach cleaning vehicle, including a vehicle body, a screening device, a conveying device, and a sand flatting device; the vehicle body is configured to provide moving power and temporary storage of garbage; the screening device is configured to shovel out the garbage in the sand, separate the garbage from the sand, and scrape the screened garbage into the conveying device; the conveying device then transports the garbage to the vehicle body for storage; the sand flatting device is configured to loosen the sand that the vehicle body walks through and to leveling gullies created by the screening device. When the cleaning vehicle screens garbage and sand, the screening is realized by means of a sand leakage chute. However, a certain amount of sand and garbage will still be sent to the conveyor belt, and the sand and garbage are mixed and collected together, which increases the burden of the device. In addition, the general tracked or wheeled cleaning vehicle can only clean the beach, while cannot do anything about the garbage on a shallow beach or mudflat.

SUMMARY OF THE DISCLOSURE

The purpose of the present disclosure is to provide a soft ground cleaning vehicle, not only for sandy beaches, but also for shoals, mudflats, and the like. The soft ground cleaning vehicle runs on the soft ground through a screw propulsion mechanism, and effectively separates sand and garbage through a vibration mechanism, thereby improving the screening effect, and further collects garbage on the shoal through a track mechanism, thereby realizing that different ground areas can be effectively cleaned.

A soft ground cleaning vehicle, comprising a main body frame; wherein each of both sides of the main body frame is arranged with a screw propulsion mechanism, and a lower portion of each of the both sides of the main body frame is arranged with a bottom frame; a power assembly is arranged on the bottom frame, and an extension frame is arranged on a lower portion of the bottom frame; the extension frame is arranged with a rotation assembly; a plastic track is arranged on the power assembly and the rotation assembly; a plurality of stand plates are arranged on an outer strip surface of the plastic track; the bottom frame is arranged with a vibration screening mechanism; the vibration screening mechanism comprises a screening motor fixing plate arranged on the bottom frame; the screening motor fixing plate is arranged with a screening motor, a first rocker is arranged on a protruding end of the screening motor, and a second rocker is arranged on an end of the first rocker; a slider is arranged on an end of the screening motor fixing plate, and a third rocker is slidably arranged in the slider; an end of the third rocker is connected to the second rocker, and the other end of the third rocker is arranged with a roller; a screening strainer is arranged between the rollers on both sides, and an arc track is arranged on a side of the screening strainer; the rollers cooperate with the arc track; the lower portion of the main body frame is arranged with a swing assembly, and a lower end of the swing assembly is connected to the screening strainer; an end of the main body frame near a higher end of the plastic track is arranged with a garbage bin.

In some embodiments, the screw propulsion mechanism comprises a propulsion motor arranged on an upper portion of the main body frame, and an active sprocket is arranged on a protruding end of the propulsion motor; the lower portion of the main body frame is arranged with a main drive seat and an auxiliary drive seat, and a screw propulsion cylinder is arranged between the main drive seat and the auxiliary drive seat; a follower sprocket is arranged on an end of the screw propulsion cylinder, and the active sprocket and the follower sprocket are wound with a chain.

In some embodiments, the screw propulsion cylinder comprises a center shaft, and an end of the center shaft is arranged with a support sleeve; the support sleeve is arranged in the main drive seat and the auxiliary drive seat; the center shaft is arranged with a main cylinder, each of both sides of the main cylinder is arranged with a welded cylinder, a side of the welding cylinder is arranged with a welded end cap, and the welded end cap is connected to the support sleeve.

In some embodiments, a side of the main drive seat is arranged with a protective baffle.

In some embodiments, the power assembly comprises a track motor arranged inside the bottom frame, a track bearing seat is arranged on the bottom frame, and a light shaft is arranged inside the track bearing seat; a square sleeve is arranged on the light shaft; a plurality of track sprockets are arranged on the square sleeve; the track motor is transmission-connected to the light shaft through a belt, and the plastic track defines a plurality of rows of through holes; the plurality of through holes engage with wheel teeth of the track sprocket.

In some embodiments, the garbage bin comprises a cabinet arranged on the end of the main body frame; an outside of an inlet of the cabinet is arranged with a feeding hopper, and the feeding hopper faces the higher end of the plastic track.

In some embodiments, a stroke shovel is arranged on a side of the cabinet.

In some embodiments, a cross-section of the screening strainer is of a multi-trapezoidal structure.

In some embodiments, an upwardly curved guiding arc is arranged on a front portion of the arc track.

In some embodiments, the soft ground cleaning vehicle is configured to clean a soft ground; the third rocker is capable of moving back and forth within a slot of the slider, the roller is capable of rolling back and forth along the arc track, and the screening strainer is capable of carrying out a certain degree of lateral reciprocating movement and oscillating at the same time, such that sediment is caused to fall to the soft ground through a vibration of the screening strainer; specifically, the roller is capable of reaching out forward in an initial position and hitting the guiding arc, for generating a first screen vibration; the roller is capable of entering into a lower surface of the arc track, and a telescopic movement of the roller in the arc track drives the arc track to move up and down, which in turn drives the screening strainer to move up and down for oscillating, thereby realizing a swinging screening of the screening strainer; the roller is capable of retracting to leave the arc track, such that the arc track falls freely after losing support of the roller, and a fall impact occurs at a lowest point of the fall, generating a second screen vibration, which completes a screening process; the roller is capable of reciprocating rolling to achieve continuous screening of the screening strainer.

Compared with the related art, the present disclosure has the following advantages.

1, the screw propulsion mechanism is started, which makes the whole device move on the soft ground; an end of the screening strainer is inserted into the ground, and sediment with garbage will be brought into the screening surface; the screening motor is started, which makes the first rocker rotate and makes the third rocker move back and forth within the slide through the second rocker; the roller rolls back and forth along the arc track, the screening strainer vibrates, and the sediment falls from meshes of the strainer onto the ground; the garbage is sent to the plastic track; the power assembly is started, which makes the plastic track rotate, and the garbage enters into the garbage bin through the conveyance of the plastic track; through the sorting of the vibrating screening mechanism, the garbage and the sediment are effectively separated, such that the screening effect is improved.

2, when the vehicle walks on watery ground such as a shoals, a front end of the vibration screening mechanism can be raised and hung up on the main body frame, and the garbage on the water can be collected and cleaned up by the track mechanism at the rear portion, so as to adapt to the area of different soft ground through different mechanisms, thereby improving the adaptability and efficiency of the overall device.

3, the cross-section of the screening strainer is of the multi-trapezoidal structure, such that the sediment and garbage on the screening surface can be blocked to a certain extent, whereby sediment can completely fall into the ground, improving the screening effect.

4, the vibration of the screening strainer is mainly realized through the cooperation of the arc track and the roller on the side of the strainer; the roller rolls back and forth along the arc track, and the screening strainer carries out a certain degree of lateral reciprocating movement; due to the curved structure of the track, the strainer will oscillate at the same time, and the sand will fall to the ground through the vibration of the screening strainer. Specifically, the roller reaches out forward in an initial position and hits the guiding arc, and a first screen vibration occurs at the time of the impact; the roller enters into a lower surface of the arc track, and the telescopic movement of the roller in the arc track drives the arc track to move up and down, which in turn drives the strainer to move up and down for swinging, thereby realizing the swinging screening of the strainer; then the roller retracts to leave the arc track, the arc track falls freely after losing the support of the roller, and a fall impact occurs at the lowest point of the fall, generating a second screen vibration; every two the impact vibrations will complete a strainer screening process; the roller is driven by a reciprocating mechanism to carry out the movement, such that the screening strainer can achieve continuous screening.

5, multiple stand plates are arranged on an outer strip surface of the plastic track, making the outer side of the plastic track partitioned into multiple garbage grooves, such that when the garbage on a screening strainer is placed on the plastic track, the garbage can be effectively placed in the garbage grooves and will not slide on the belt body, thereby avoiding falling on the ground.

6, when the garbage screened by the vibration screening mechanism is put onto the plastic track, due to the stand plates arranged on the plastic track, with a stand plate at a feeding end of the plastic track being in a tilted state, the stand plate in this state is able to push the garbage, such that the garbage can be smoothly transitioned to the plastic track, which plays a better articulation effect.

Figure 1:
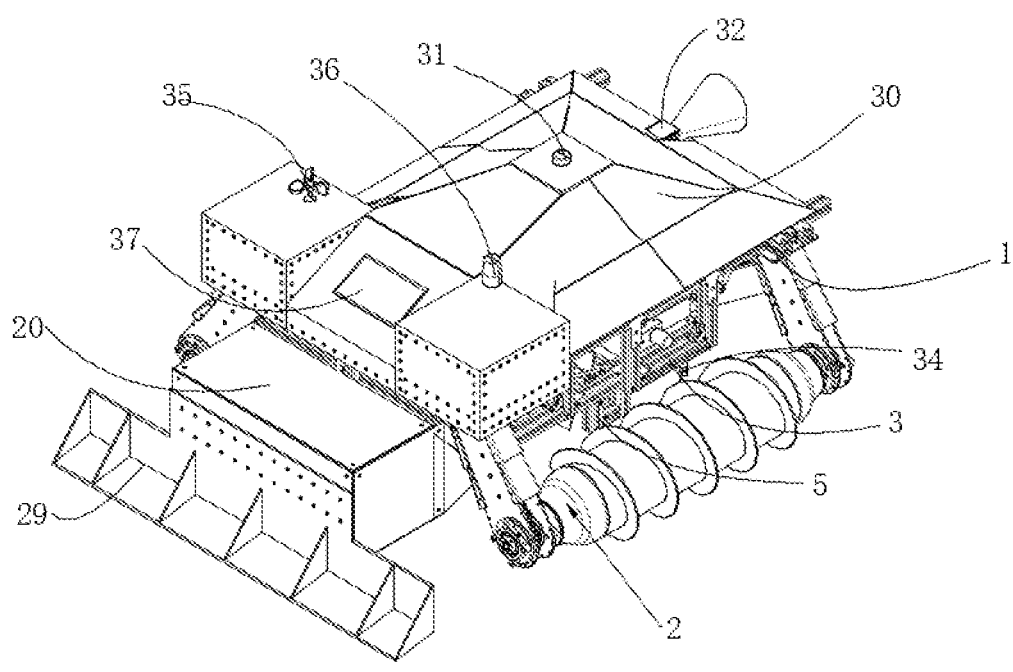
FIG. 1 is a structural schematic view according to the present disclosure.

Reference numerals: 1—main body frame, 2—screw propulsion mechanism, 3—bottom frame, 4—power assembly, 5—extension frame, 6—rotation assembly, 7—plastic track, 8—stand plate, 9—vibration screening mechanism, 10—screening motor fixing plate, 11—screening motor, 12—first rocker, 13—second rocker, 14—slider, 15—third rocker, 16—roller, 17—screening strainer, 18—arc track, 181—guiding arc, 19—swing assembly, 20—garbage bin, 201—propulsion motor, 202—active sprocket, 203—main drive seat, 204—auxiliary drive seat, 205—screw propulsion cylinder, 206—follower sprocket, 207—chain, 208—center shaft, 209—support sleeve, 210—main cylinder, 211—welded cylinder, 212—welded end cover, 213—protective baffle, 21—track motor, 22—track bearing seat, 23—light shaft, 24—square sleeve, 25—track sprocket, 26—through hole, 27—cabinet, 28—feeding hopper, 29—stroke shovel, 30—top cover, 31—omnidirectional LIDAR, 32—sixteen-lines LIDAR, 33—infrared binocular vision, 34—water-quality detection sensor, 35—anemometer, 36—warning light, 37—interactive display, 90—bar slot, 91—short shaft, 92—limit block.

DETAILED DESCRIPTION

The present disclosure is further described below in conjunction with the accompanying drawings and embodiments, but is not to be taken as a basis for limiting the present disclosure.

Figure 2:
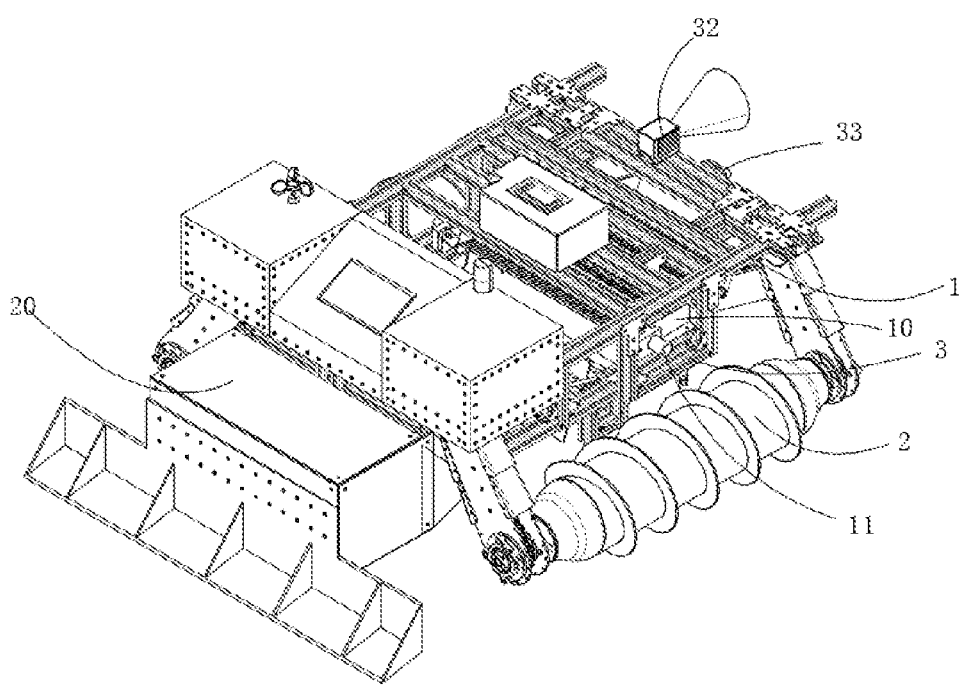
FIG. 2 is a schematic view of the soft ground cleaning vehicle shown in FIG. 1 with a top cover removed.
Figure 3:
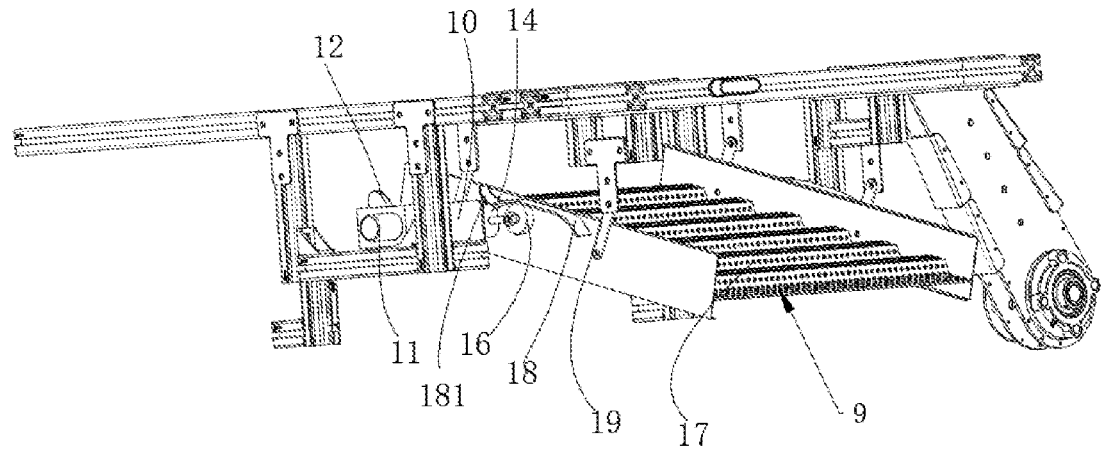
FIG. 3 is a schematic view of a vibration screening mechanism.
Figure 4:
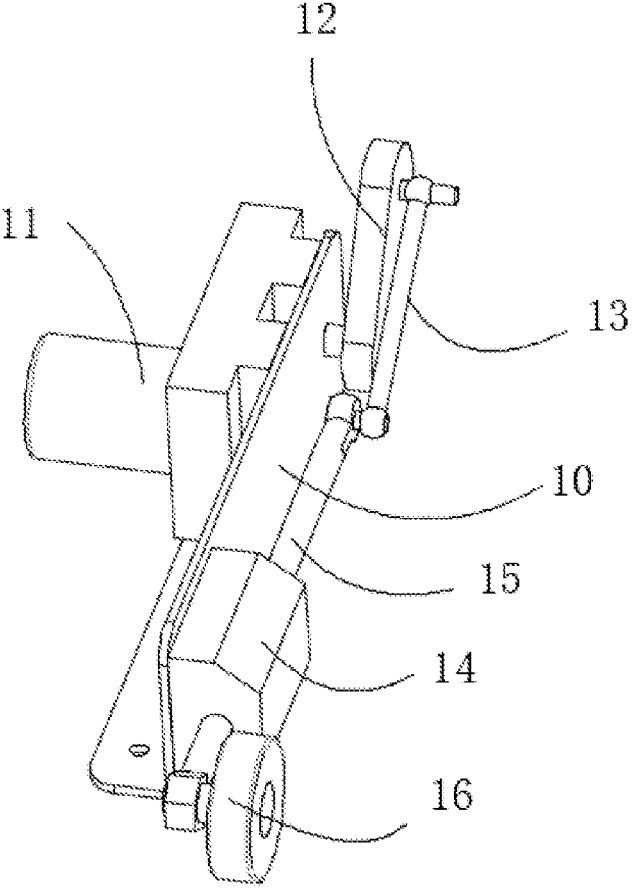
FIG. 4 is a schematic view of rockers.
Figure 5:
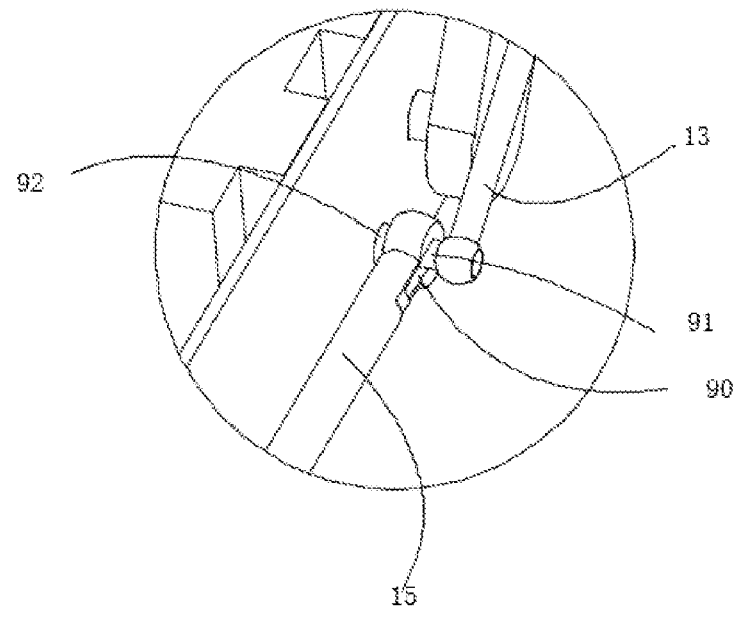
FIG. 5 is a schematic view of a bar slot.
Figure 6:
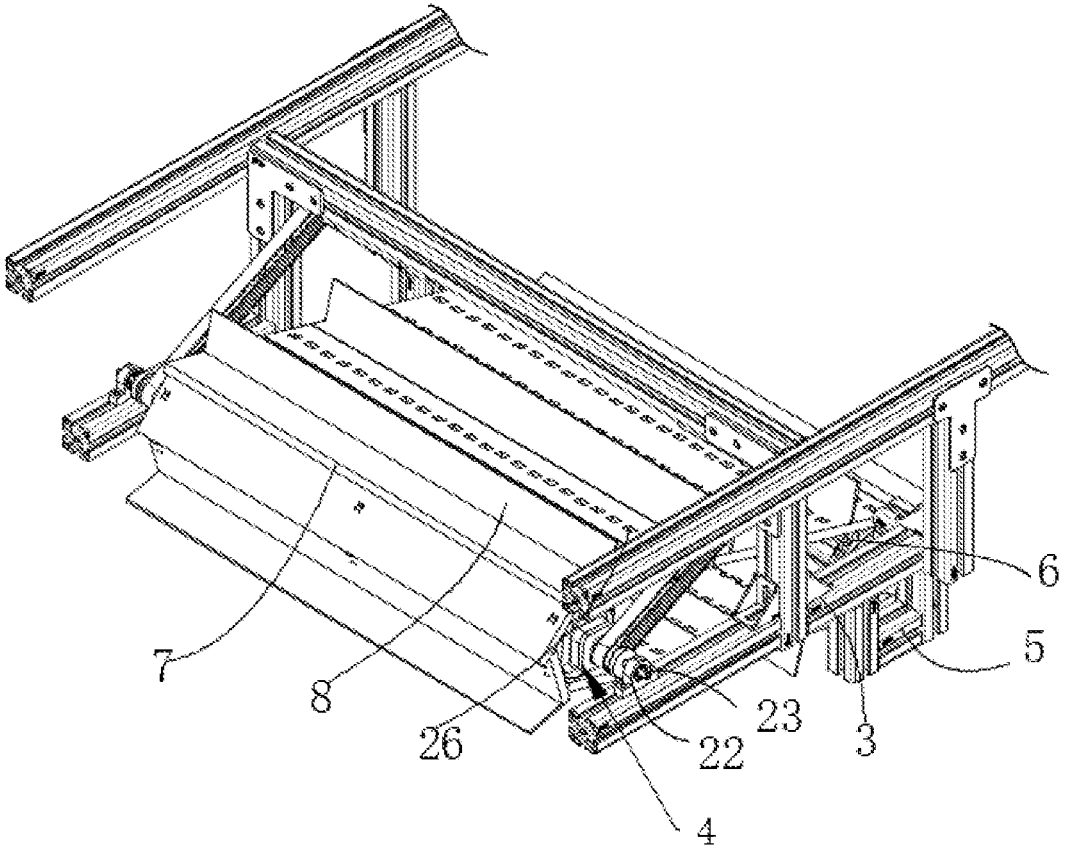
FIG. 6 is a schematic view of a plastic track.
Figure 7:
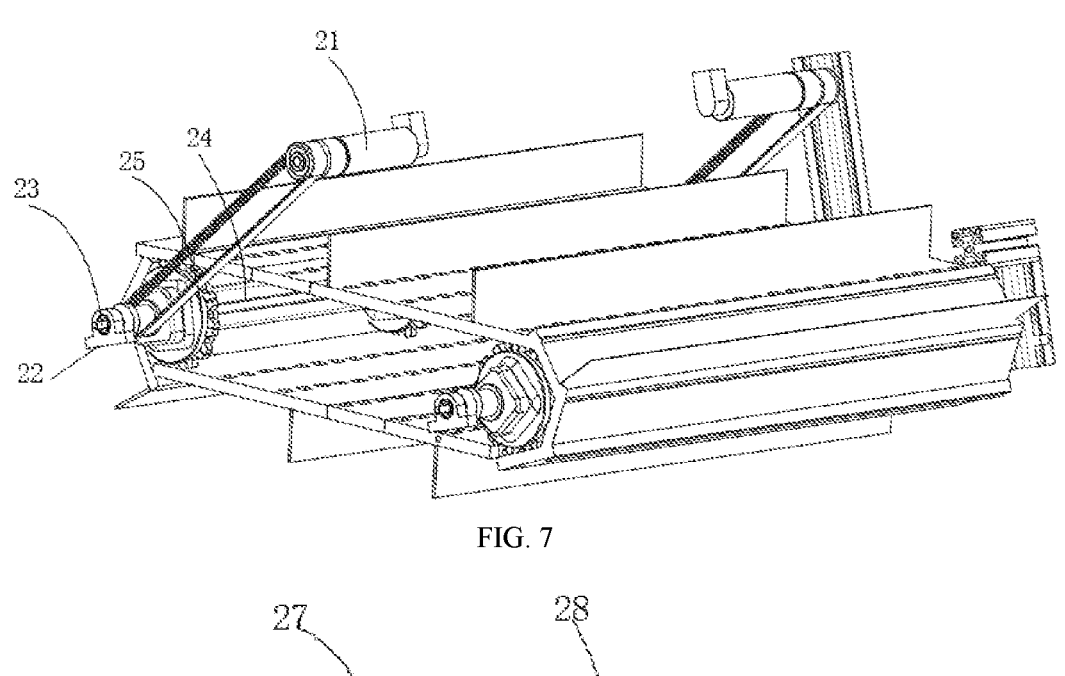
FIG. 7 is a schematic view of a power assembly.

Embodiment: a soft ground cleaning vehicle, as shown in FIG. 1, including a main body frame 1; each of both sides of the main body frame 1 is arranged with a screw propulsion mechanism 2, and a lower portion of each of the both sides of the main body frame 1 is arranged with a bottom frame 3; a power assembly 4 is arranged on the bottom frame 3, and an extension frame 5 is arranged on a lower portion of the bottom frame 3; the extension frame 5 is arranged with a rotation assembly 6; a plastic track 7 is arranged on the power assembly 4 and the rotation assembly 6; multiple stand plates 8 are arranged on an outer strip surface of the plastic track 7, making the outer side of the plastic track partitioned into multiple garbage grooves, such that when the garbage on a screening strainer is placed on the plastic track, the garbage can be effectively placed in the garbage grooves and will not slide on the belt body, thereby avoiding falling on the ground; when the garbage screened by a vibration screening mechanism is put onto the plastic track, due to the stand plates arranged on the plastic track, with a stand plate at a feeding end of the plastic track being in a tilted state, the stand plate in this state is able to push the garbage, such that the garbage can be smoothly transitioned to the plastic track, which plays a better articulation effect; the power assembly 4 includes a track motor 21 arranged inside the bottom frame 3, a track bearing seat 22 is arranged on the bottom frame 3, and a light shaft 23 is arranged inside the track bearing seat 22; a square sleeve 24 is arranged on the light shaft 23; multiple track sprockets 25 are arranged on the square sleeve 24; as shown in FIGS. 6 and 7, the track motor 21 is transmission-connected to the light shaft 23 through a belt, and the plastic track 7 defines multiple rows of through holes 26; the through holes 26 can engage with wheel teeth of the track sprocket 25, and constituent parts in the rotation assembly are in line with parts of the power assembly; the bottom frame 3 is arranged with a vibration screening mechanism 9. As shown in FIGS. 3 and 4, the vibration screening mechanism 9 includes a screening motor fixing plate 10 arranged on the bottom frame 3; the screening motor fixing plate 10 is arranged with a screening motor 11, a first rocker 12 is arranged on a protruding end of the screening motor 11, and a second rocker 13 is arranged on an end of the first rocker 12; a slider 14 is arranged on an end of the screening motor fixing plate 10, and a third rocker 15 is slidably arranged in the slider 14; an end of the third rocker 15 is connected to the second rocker 13, and the other end of the third rocker 15 is arranged with a roller 16; the end of the third rocker 15 defines a bar slot 90; as shown in FIG. 5, an end of the second rocker 13 is arranged with a short shaft 91, which passes through the bar slot 90; an end of the short shaft 91 is arranged with a limit block 92. If the bar slot and the short shaft are not provided, the second rocker may interfere with the movement of the third rocker, affecting the reciprocating movement of the third rocker. After the bar slot and the short shaft are provided, a certain degree of freedom can be obtained in the movement of the two rockers. A screening strainer 17 is arranged between the rollers 16 on both sides, and an arc track 18 is arranged on a side of the screening strainer 17; an upwardly curved guiding arc 181 is arranged on a front portion of the arc track 18, and the rollers 16 may cooperate with the arc track 18; a lower portion of the main body frame 1 is arranged with a swing assembly 19, and a lower end of the swing assembly 19 is connected to the screening strainer 17; an end of the screening strainer 17 is close to the plastic track 7, and a cross-section of the screening strainer 17 is of a multi-trapezoidal structure, which makes sediment and garbage in the screening surface block to a certain extent, and the sediment and garbage can completely fall into the ground, thereby enhancing the screening effect; an end of the main body frame 1 near a higher end of the plastic track 7 is arranged with a garbage bin 20; a top cover 30 is arranged on a top of the main body frame, and the top cover 30 is arranged with a photovoltaic panel for absorbing solar energy and converting it into electricity; the top cover is further arranged with an omni-directional LIDAR 31 for scanning a surrounding environment and real-time feedback; as shown in FIGS. 1 and 2, a front end of the main body frame is arranged with a sixteen-lines LIDAR 32 to strengthen an image effect, and further arranged with an infrared binocular vision 33 to enhance an image effect at night and temperature measurement; a bottom end of the bottom frame is arranged with a water-quality detection sensor 34, which displays a state of water in real-time; a rear side of the main body frame is arranged with an anemometer 35, a warning light 36, and an interactive display 37, and the interactive display is capable of displaying various types of information for interaction. The vibration of the screening strainer is mainly realized through the cooperation of the arc track and the roller on the side of the strainer; the roller rolls back and forth along the arc track, and the screening strainer carries out a certain degree of lateral reciprocating movement; due to the curved structure of the track, the strainer will oscillate at the same time, and the sand will fall to the ground through the vibration of the screening strainer. Specifically, the roller reaches out forward in an initial position and hits the guiding arc, and a first screen vibration occurs at the time of the impact; the roller enters into a lower surface of the arc track, and the telescopic movement of the roller in the arc track drives the arc track to move up and down, which in turn drives the strainer to move up and down for swinging, thereby realizing the swinging screening of the strainer; then the roller retracts to leave the arc track, the arc track falls freely after losing the support of the roller, and a fall impact occurs at the lowest point of the fall, generating a second screen vibration; every two the impact vibrations will complete a strainer screening process; the roller is driven by a reciprocating mechanism to carry out the movement, such that the screening strainer can achieve continuous screening.

Figure 9:
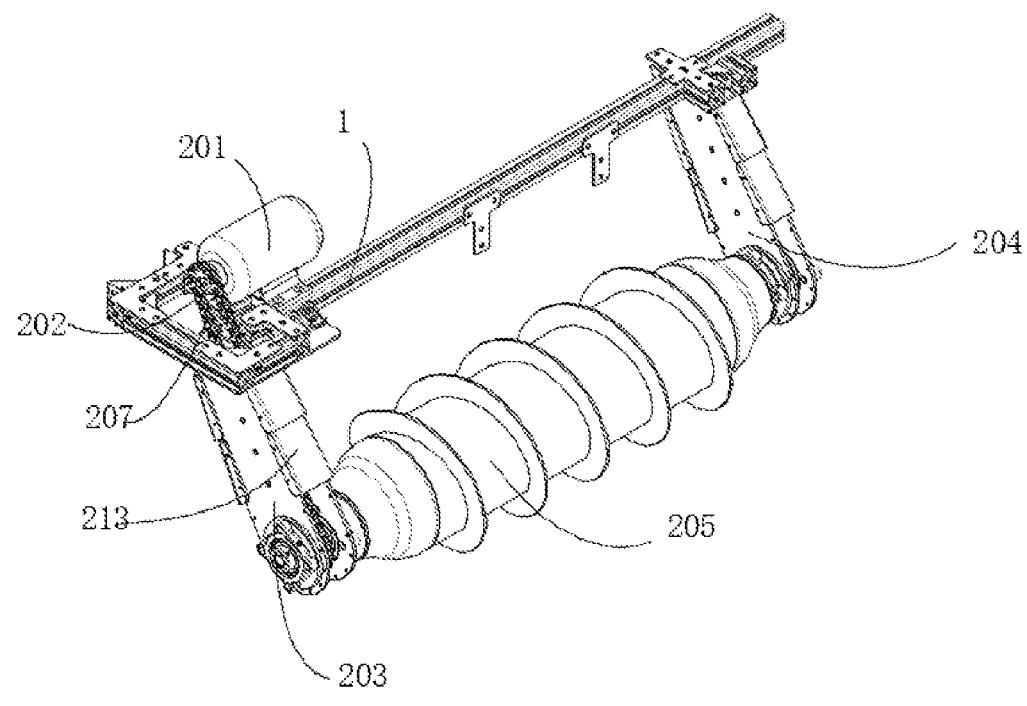
FIG. 9 is a schematic view of a screw propulsion mechanism.
Figure 10:
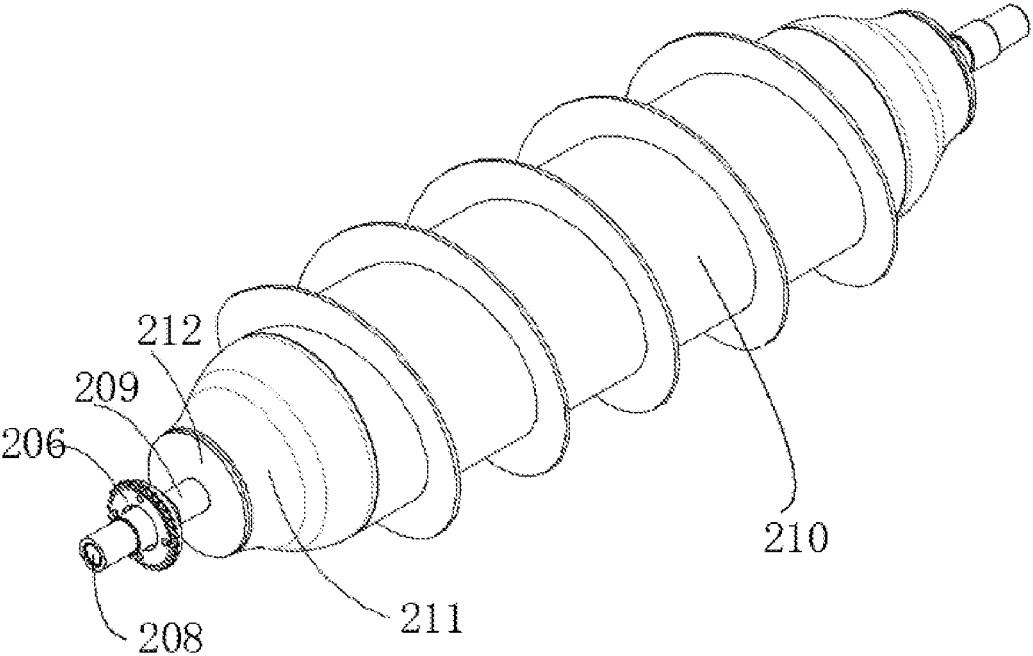
FIG. 10 is a schematic view of a screw propulsion cylinder.

As shown in FIGS. 9 and 10, the screw propulsion mechanism 2 includes a propulsion motor 201 arranged on an upper portion of the main body frame 1, and an active sprocket 202 is arranged on a protruding end of the propulsion motor 201; a lower portion of the main body frame 1 is arranged with a main drive seat 203 and an auxiliary drive seat 204, and a screw propulsion cylinder 205 is arranged between the main drive seat 203 and the auxiliary drive seat 204; a follower sprocket 206 is arranged on an end of the screw propulsion cylinder 205, and the active sprocket 202 and the follower sprocket 206 are wound with a chain 207; the propulsion motor drives the screw propulsion cylinder to rotate through the chain transmission, thereby driving the whole device to move on the ground. The screw propulsion cylinder 205 includes a center shaft 208, and an end of the center shaft 208 is arranged with a support sleeve 209; the support sleeve 209 is arranged in the main drive seat 203 and the auxiliary drive seat 204; the center shaft 208 is arranged with a main cylinder 210, each of both sides of the main cylinder 210 is arranged with a welded cylinder 211, a side of the welding cylinder 211 is arranged with a welded end cap 212, and the welded end cap 212 is connected to the support sleeve 209. Compared with the traditional wheel movement, the proposed screw propulsion method is better adapted to soft ground such as sediment and is not easy to sink into the sediment. A side of the main drive seat 203 is arranged with a protective baffle 213, such that the chain will not be exposed to the air, providing protection to the chain.

Figure 8:
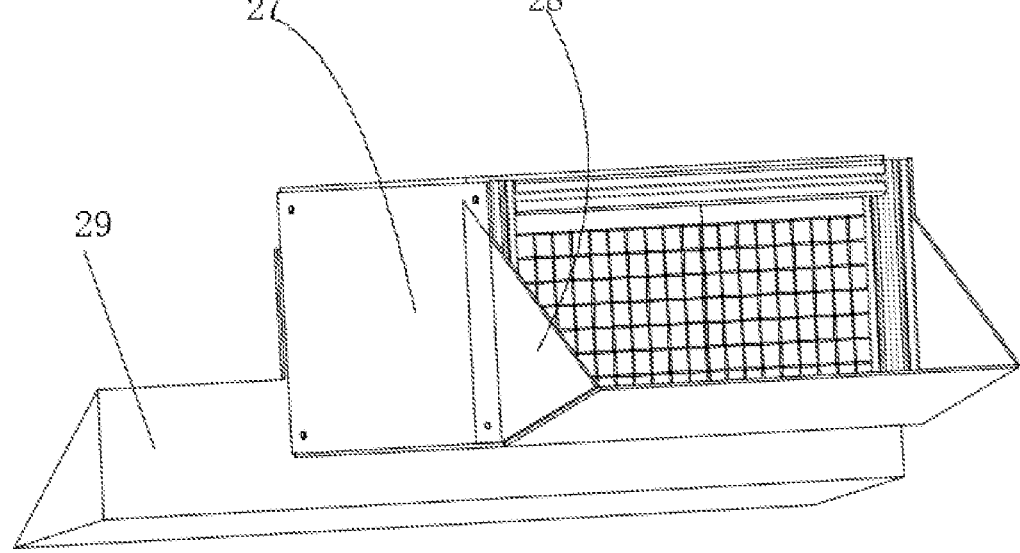
FIG. 8 is a schematic view of a garbage bin.

As shown in FIG. 8, the garbage bin 20 includes a cabinet 27 arranged on the end of the main body frame 1; an outside of an inlet of the cabinet 27 is arranged with a feeding hopper 28, and the feeding hopper 28 faces the higher end of the plastic track 7; the feeding hopper is able to receive garbage in a better way, and an inlet thereof is arranged with a collection strainer for separating the large garbage from the small garbage. A stroke shovel 29 is arranged on a side of the cabinet 27 to make the upturned ground flat again.

Figure 11:
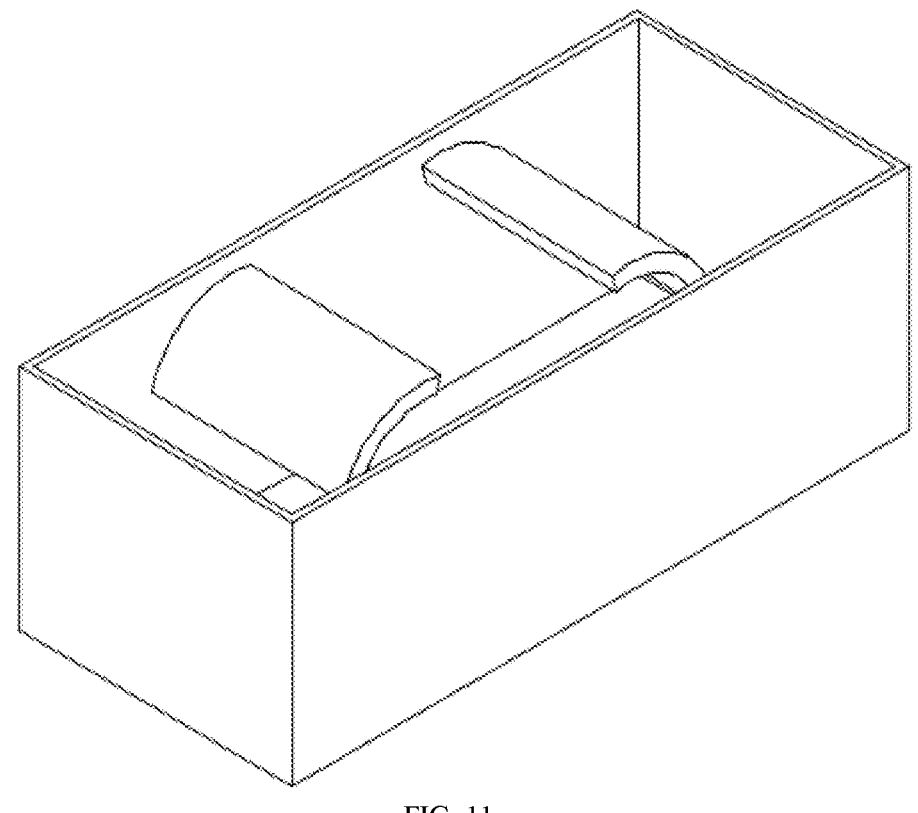
FIG. 11 is a schematic view of a garbage bin with curved plates.

In some embodiments, the garbage bin may be opened upward, with an opening aligned under an end of the plastic track; the garbage bin is symmetrically arranged with curved plates, as shown in FIG. 11. When the garbage is fed into the cabinet, the garbage is piled up in the middle and not piled up on both sides, which makes the garbage easily full. The curved plates are set up such that the garbage is deflected when fed into the cabinet, and the garbage is fed to both sides, such that the sides are even; further, a sensor is arranged at an inlet of the garbage bin; when the cabinet is full of garbage, the sensor sends a signal to the system.

The working principle of the present disclosure: the screw propulsion mechanism is started, and the propulsion motor will start; through the chain transmission, the screw propulsion cylinder will rotate, which makes the whole device move on the soft ground; an end of the screening strainer is inserted into the ground, and sediment with garbage will be brought into the screening surface; the screening motor is started, which makes the first rocker rotate and makes the third rocker move back and forth within the slide through the second rocker; the roller rolls back and forth along the arc track, the screening strainer vibrates, and the sediment falls from meshes of the strainer onto the ground; the garbage is sent to the plastic track; the power assembly is started, which makes the plastic track rotate, and the garbage enters into the garbage bin through the conveyance of the plastic track; through the sorting of the vibrating screening mechanism, the garbage and the sediment are effectively separated, such that the screening effect is improved.

What is claimed is:

1. A soft ground cleaning vehicle, comprising a main body frame (1); wherein each of both sides of the main body frame (1) is arranged with a screw propulsion mechanism (2), and a lower portion of each of the both sides of the main body frame (1) is arranged with a bottom frame (3); a power assembly (4) is arranged on the bottom frame (3), and an extension frame (5) is arranged on a lower portion of the bottom frame (3); the extension frame (5) is arranged with a rotation assembly (6); a plastic track (7) is arranged on the power assembly (4) and the rotation assembly (6); a plurality of stand plates (8) are arranged on an outer strip surface of the plastic track (7); the bottom frame (3) is arranged with a vibration screening mechanism (9); the vibration screening mechanism (9) comprises a screening motor fixing plate (10) arranged on the bottom frame (3); the screening motor fixing plate (10) is arranged with a screening motor (11), a first rocker (12) is arranged on a protruding end of the screening motor (11), and a second rocker (13) is arranged on an end of the first rocker (12); a slider (14) is arranged on an end of the screening motor fixing plate (10), and a third rocker (15) is slidably arranged in the slider (14); an end of the third rocker (15) is connected to the second rocker (13), and the other end of the third rocker (15) is arranged with a roller (16); wherein the roller (16) comprises two rollers disposed on opposite sides of a screening strainer (17), and an arc track (18) is arranged on a side of the screening strainer (17); the rollers (16) cooperate with the arc track (18); the lower portion of the main body frame (1) is arranged with a swing assembly (19), and a lower end of the swing assembly (19) is connected to the screening strainer (17); an end of the main body frame (1) near a higher end of the plastic track (7) is arranged with a garbage bin (20).

2. The soft ground cleaning vehicle according to claim 1, wherein the screw propulsion mechanism (2) comprises a propulsion motor (201) arranged on an upper portion of the main body frame (1), and an active sprocket (202) is arranged on a protruding end of the propulsion motor (201); the lower portion of the main body frame (1) is arranged with a main drive seat (203) and an auxiliary drive seat (204), and a screw propulsion cylinder (205) is arranged between the main drive seat (203) and the auxiliary drive seat (204); a follower sprocket (206) is arranged on an end of the screw propulsion cylinder (205), and the active sprocket (202) and the follower sprocket (206) are wound with a chain (207).

3. The soft ground cleaning vehicle according to claim 2, wherein the screw propulsion cylinder (205) comprises a center shaft (208), and an end of the center shaft (208) is arranged with a support sleeve (209); the support sleeve (209) is arranged in the main drive seat (203) and the auxiliary drive seat (204); the center shaft (208) is arranged with a main cylinder (210), each of both sides of the main cylinder (210) is arranged with a welded cylinder (211), a side of the welding cylinder (211) is arranged with a welded end cap (212), and the welded end cap (212) is connected to the support sleeve (209).

4. The soft ground cleaning vehicle according to claim 2, wherein a side of the main drive seat (203) is arranged with a protective baffle (213).

5. The soft ground cleaning vehicle according to claim 1, wherein the power assembly (4) comprises a track motor (21) arranged inside the bottom frame (3), a track bearing seat (22) is arranged on the bottom frame (3), and a light shaft (23) is arranged inside the track bearing seat (22); a square sleeve (24) is arranged on the light shaft (23); a plurality of track sprockets (25) are arranged on the square sleeve (24); the track motor (21) is transmission-connected to the light shaft (23) through a belt, and the plastic track (7) defines a plurality of rows of through holes (26); the plurality of through holes (26) engage with wheel teeth of the plurality of track sprockets (25).

6. The soft ground cleaning vehicle according to claim 1, wherein the garbage bin (20) comprises a cabinet (27) arranged on the end of the main body frame (1); an outside of an inlet of the cabinet (27) is arranged with a feeding hopper (28), and the feeding hopper (28) faces the higher end of the plastic track (7).

7. The soft ground cleaning vehicle according to claim 6, wherein a stroke shovel (29) is arranged on a side of the cabinet (27).

8. The soft ground cleaning vehicle according to claim 1, wherein a cross-section of the screening strainer (17) is of a multi-trapezoidal structure.

9. The soft ground cleaning vehicle according to claim 1, wherein an upwardly curved guiding arc (181) is arranged on a front portion of the arc track (18).

10. The soft ground cleaning vehicle according to claim 9, wherein the soft ground cleaning vehicle is configured to clean a soft ground; the third rocker is capable of moving back and forth within a slot of the slider, the roller is capable of rolling back and forth along the arc track, and the screening strainer is capable of carrying out a certain degree of lateral reciprocating movement and oscillating at the same time, such that sediment is caused to fall to the soft ground through a vibration of the screening strainer; specifically, the roller is capable of reaching out forward in an initial position and hitting the guiding arc, for generating a first screen vibration; the roller is capable of entering into a lower surface of the arc track, and a telescopic movement of the roller in the arc track drives the arc track to move up and down, which in turn drives the screening strainer to move up and down for oscillating, thereby realizing a swinging screening of the screening strainer; the roller is capable of retracting to leave the arc track, such that the arc track falls freely after losing support of the roller, and a fall impact occurs at a lowest point of the fall, generating a second screen vibration, which completes a screening process; the roller is capable of reciprocating rolling to achieve continuous screening of the screening strainer.

\* \* \* \* \*